United States Patent
Weatherford et al.

(10) Patent No.: US 12,363,230 B2
(45) Date of Patent: Jul. 15, 2025

(54) SYSTEMS AND METHODS FOR MONITORING VOICE SERVICES

(71) Applicant: ADTRAN, Inc., Huntsville, AL (US)

(72) Inventors: Daniel Weatherford, Ardmore, AL (US); Jeremy Craig Lyon, Harvest, AL (US)

(73) Assignee: Adtran, Inc., Huntsville, AL (US)

( * ) Notice: Subject to any disclaimer, the term of this patent is extended or adjusted under 35 U.S.C. 154(b) by 450 days.

(21) Appl. No.: 18/051,398

(22) Filed: Oct. 31, 2022

(65) Prior Publication Data
US 2024/0146848 A1    May 2, 2024

(51) Int. Cl.
| H04M 7/00 | (2006.01) |
| H04L 65/1073 | (2022.01) |
| H04L 69/40 | (2022.01) |
| H04Q 11/00 | (2006.01) |

(52) U.S. Cl.
CPC ...... *H04M 7/0084* (2013.01); *H04L 65/1073* (2013.01); *H04L 69/40* (2013.01); *H04Q 11/0067* (2013.01); *H04Q 2011/0064* (2013.01); *H04Q 2011/0083* (2013.01)

(58) Field of Classification Search
CPC ............. H04M 7/0084; H04Q 11/0067; H04Q 2011/0064; H04Q 2011/0083; H04L 69/40; H04L 65/1073; H04L 12/6418
See application file for complete search history.

(56) References Cited

U.S. PATENT DOCUMENTS

| 7,706,373 B2 | 4/2010 | Xu et al. |
| 8,055,778 B2 | 11/2011 | Richardson et al. |
| 9,641,561 B2 | 5/2017 | Larkin |
| 10,771,396 B2 | 9/2020 | Osterland et al. |
| 2009/0074406 A1* | 3/2009 | Wurst ................. H04L 69/40 398/25 |
| 2010/0027529 A1* | 2/2010 | Jackson ............. H04L 12/6418 370/352 |
| 2011/0026517 A1 | 2/2011 | Capuozzo et al. |
| 2015/0312387 A1* | 10/2015 | Merino Vazquez ......... H04L 65/1073 370/216 |

(Continued)

OTHER PUBLICATIONS

PCT International Search Authority, Matos, "Written Opinion of the International Searching Authority," International Application No. PCT/US2023/034013, Jan. 11, 2024.

*Primary Examiner* — Vinncelas Louis
(74) *Attorney, Agent, or Firm* — Jon E. Holland; Butler Snow LLP

(57) ABSTRACT

A system for monitoring voice services has a service monitor that is configured to periodically assess the registration state of a voice service provided to a customer. If the service transitions to an unregistered state, the service monitor logs the state change and continues to monitor the service to determine approximately when the service transitions back to a registered state. Thus, over time, the service monitor tracks loss-of-registration (LOR) events and analyzes the history of such LOR events to determine when they are indicative of a network or service problem that warrants further analysis or attention by a user. Using these techniques, the service monitor may be able to detect and, in some cases, diagnose problems that are degrading voices services for one or more customers even before such customers realize that their services are degraded.

16 Claims, 4 Drawing Sheets

(56) References Cited

U.S. PATENT DOCUMENTS

| | | |
|---|---|---|
| 2015/0326619 A1 | 11/2015 | Lau et al. |
| 2021/0234757 A1 | 7/2021 | Abe et al. |
| 2022/0078677 A1 | 3/2022 | Mn et al. |

\* cited by examiner

SYSTEMS AND METHODS FOR MONITORING VOICE SERVICES

RELATED ART

Internet service providers (ISPs) often provide both voice and data services to customers using various protocols applicable to subscribed services. Ensuring that the data and voice services are robust and reliable is highly important to ISPs, and various techniques have been developed to monitor the health of the data flows between the network and the customer premises. However, not all communication problems are easily detected, and at least some problems can sometimes go undetected for extended periods of time.

As an example, some network problems can cause intermittent or transitory performance degradations that can go undetected and undiagnosed for very long periods of times, such as weeks, months, or even longer. Such intermittent problems can cause customer frustrations and can ultimately lead to performance degradation or loss of service at a critical time for a customer, further increasing customer frustration. For example, a problem that results in intermittent loss of voice service can occur on a network over time and may not be discovered by a customer until he or she attempts to place a call during an instance of the service loss. Even after such event, the intermittent nature of the problem may make the source of the problem difficult to diagnose. In addition, in some cases, the source of the service loss may be attributed to a network problem or failure for which the ISP is not responsible. Improved techniques for detecting and diagnosing problems with data and voice services are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for monitoring voice services. In some embodiments, a service monitor is configured to periodically assess the registration state of a voice service from an access node. If the service transitions to an unregistered state, the service monitor logs the state change and continues to monitor the service to determine approximately when the service transitions back to a registered state. Thus, over time, the service monitor tracks loss-of-registration (LOR) events, including the time and duration of such events, and analyzes the history of such LOR events to determine when they are indicative of a network or service problem that warrants further analysis or attention by a technician or other user. Such a decision may also be based on a similar history for services provided to other customers, and the service monitor may also provide information indicating a root cause of a communication problem that may be causing the service loss. Using these techniques, the service monitor may be able to detect and, in some cases, diagnose problems that are degrading voice services for one or more customers even before such customers realize that their services are degraded.

Figure 1:
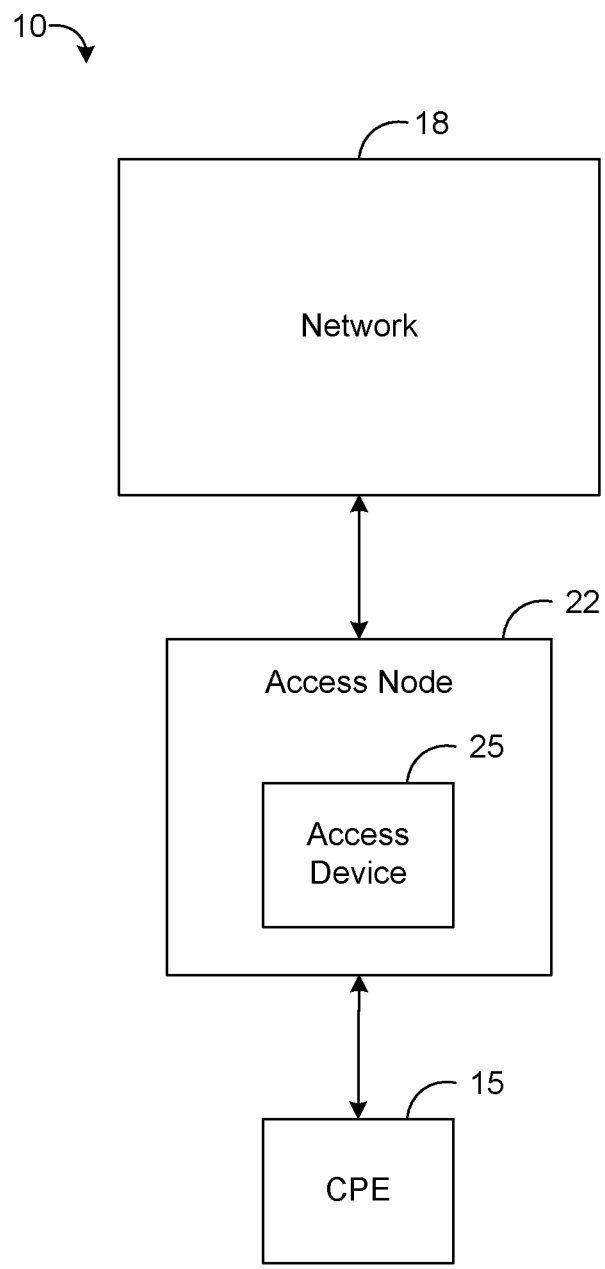
FIG. 1 is a block diagram illustrating an exemplary embodiment of a communication system.

FIG. 1 depicts an exemplary embodiment of a communication system 10 for communicating data between a network 18 and customer premises equipment (CPE) 15 at one or more customer premises (CP). In this regard, the network 18 can comprise any of various types of networks, such as the public switched telephone network (PSTN), wide area networks (WANs), cellular networks, or the Internet. As shown by FIG. 1, the network 18 is coupled to an access node 22, which is configured to demultiplex one or more data streams received from the network 18, thereby separating the data stream into a plurality of demultiplexed packet flows where each packet flow includes packets for a respective service. In this regard, customers subscribe for services, such as Internet service, telephone service, and television service, and each downstream packet flow within the access node 22 generally corresponds to and defines downstream data for a respective service for a respective customer. The packet flows are switched within the access node 22 such that each packet flow is forwarded to its destination CPE 15.

In this regard, the access node 22 has at least one access device 25 that is coupled to and provides data and voice services to at least one CPE 15. In some embodiments, the access device 25 may be an optical device, such as an optical line terminal (OLT), for communicating optical signals. In other embodiments, the access device 25 may be configured to communicate electrical signals. As an example, the access device 25 may be a digital subscriber line (DSL) transceiver configured to communicate signals via one or more twisted-wire pairs or other types of electrical connections. In other embodiments, the access device 25 may communicate with CPE 15 wirelessly. For illustrative purposes, it will be assumed hereafter that the access device 25 is implemented via an OLT, but it should be emphasized that other types of access devices are possible.

Figure 2:
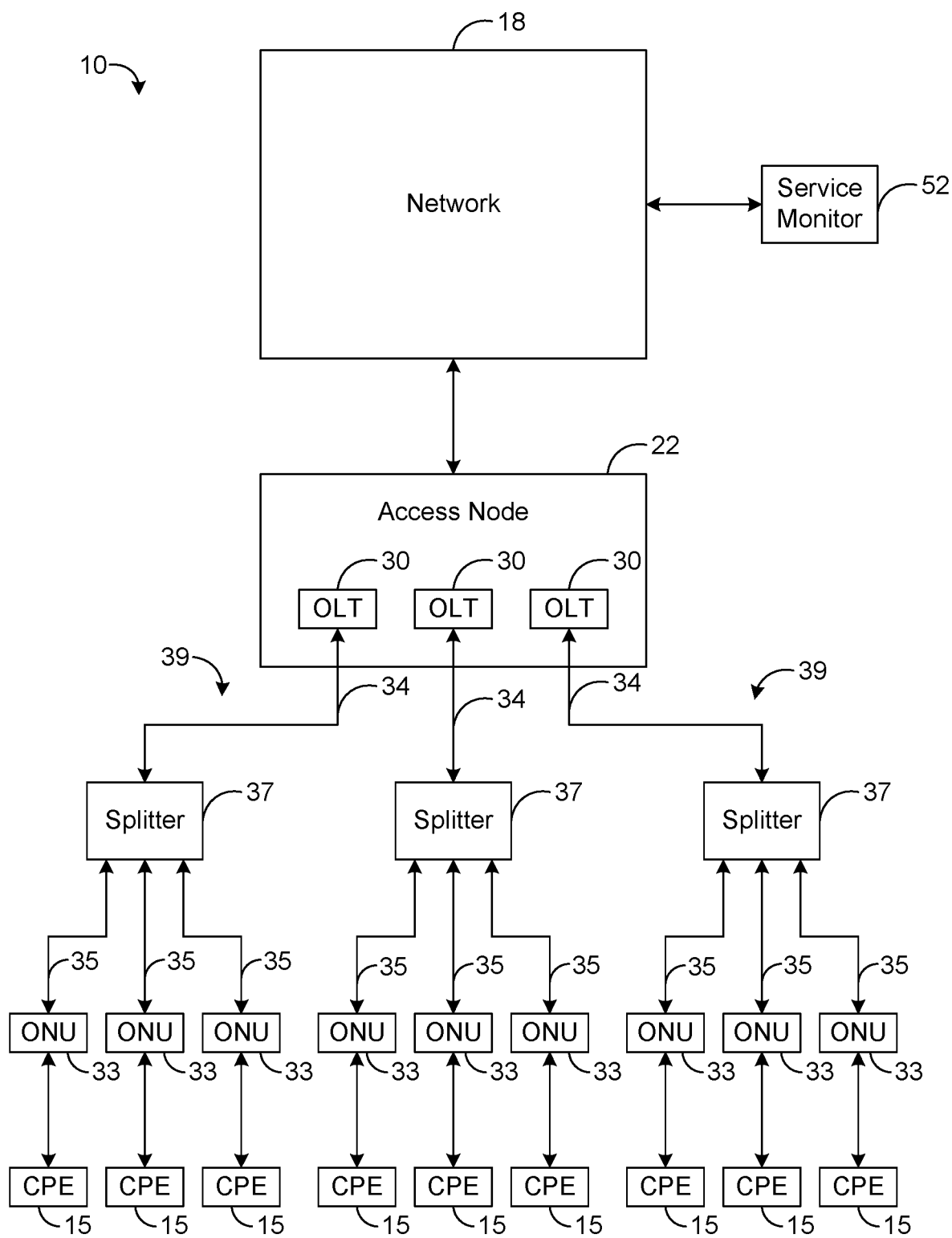
FIG. 2 is a block diagram illustrating an exemplary embodiment of a communication system having an access node that includes a plurality of optical line terminals (OLTs) communicating with customer premises equipment (CPE) through passive optical networks (PONs).

FIG. 2 depicts an exemplary embodiment of a communication system 10 with an access node 22 having a plurality of optical line terminals (OLTs) 30 for communicating optical signals. Each OLT 30 is coupled to a respective set of optical network units (ONUs) 33 via a plurality of communication connections 34, 35, which in the embodiment shown by FIG. 2 are optical fibers. Each optical fiber 34 is coupled to a respective optical splitter 37 that splits signals from the access node 22 across a plurality of optical fibers 35. Each ONU 33 is configured to receive at least one packet flow from the access node 22 and to convert the received packet flows from the optical domain to the electrical domain. Each OLT 30 and the optical components coupled to it, including the optical splitter 37, ONUs 33, and optical fibers 34, 35 form a passive optical network (PON) 39 for communicating the packet flows via optical signals. In other embodiments, other types of optical channels and non-optical channels may be used to communicate the packet flows between the access node 22 and the CPE 15. Note that FIG. 2 shows three PONs 39 for simplicity of illustration. However, there may be any number of PONs 39 on an access node 22, and each PON 39 may have any number of optical components, such as ONUs 33. In the upstream direction, packet flows received from the ONUs 33 are multiplexed by the access node 22 into at least one data stream that is transmitted to the network 18.

As shown by FIG. 2, the system 10 also includes at least one service monitor 52 that is configured to communicate with the OLTs 30 via the network 18 or otherwise to obtain information indicative of the status of services provided by the OLTs 30. The service monitor 52 may be implemented in hardware or any combination of hardware, software, or firmware. In some embodiments, the service monitor 52 is implemented with a computer running software to implement the ascribed functionality, such as a handheld, desktop, laptop, or server computer, but other types of configurations of the service monitor 52 are possible in other embodiments.

Figure 3:
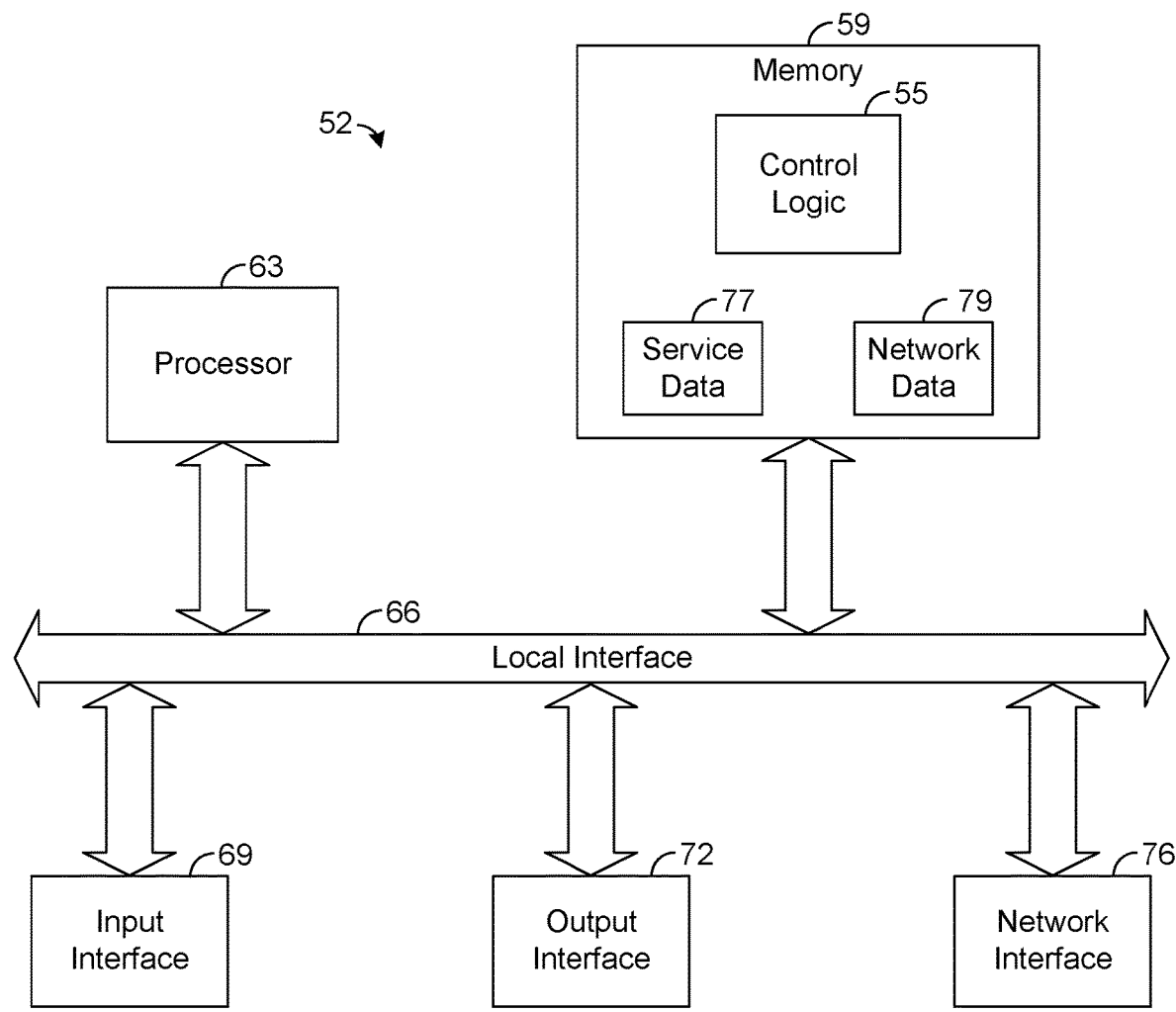
FIG. 3 is a block diagram illustrating an exemplary embodiment of a service monitor, such as is depicted by FIG. 2.

FIG. 3 depicts an exemplary embodiment of the service monitor 52. As shown by FIG. 3, the service monitor 52 comprises control logic 55 for generally controlling the operation of the service monitor 52, as will be described in more detail hereafter. In the exemplary service monitor 52 illustrated by FIG. 3, the control logic 55 is implemented in software and stored in memory 59 for execution by at least one processor 63. However, it is possible for at least a portion of the control logic 55 to be implemented in hardware, such as field programmable gate array (FPGA) or other type of hardware.

Note that the control logic 55, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary service monitor 52 depicted by FIG. 3 comprises at least one conventional processor 63, such as a digital signal processor (DSP) or a central processing unit (CPU), that communicates to and drives the other elements within the service monitor 52 via a local interface 66, which can include at least one bus. Furthermore, an input interface 69, for example, a keyboard or a mouse, can be used to input data from a user of the service monitor 52, and an output interface 72, for example, a printer, monitor, liquid crystal display (LCD), or other display apparatus, can be used to output data to the user. In some embodiments, the input interface 69 and the output interface 72 may be integrated or otherwise share resources. As an example, the input interface 69 and the output interface 72 may be implemented as a touchscreen that is configured to display images and receive user input via capacitive sensing of touches of the touchscreen. Further, a network interface 76, such as at least one modem, may be used to exchange data with the network 18 (FIG. 1).

As shown by FIG. 3, the service monitor 52 is configured to store and maintain service data 77 that is indicative of at least the registration states of various services, such as voice services, provided by one or more OLTs 30, as well as other information that may be useful for identifying and diagnosing problems with such services. In this regard, the service monitor 52 is configured to communicate with the OLTs 30 to determine information indicative of the states of the monitored services and to store such information as the service data 77. This information is repetitively acquired over time thereby defining a history of the registration states and possibly other states of services being monitored. As will be described in more detail below, the control logic 55 is configured to analyze the service data 77 to identify and possibly diagnose a problem that should be reported to a technician or other user for further analysis or other actions. As an example, the control logic 55 may transmit an alert (e.g., an email message or other type of message) to a user to warn or otherwise notify the user of the detected problem. In response, the user may take further actions, such as actions to diagnose and/or correct the identified problem.

Note that there are various techniques that may be used to determine and/or acquire the service data 77. In some embodiments, the service monitor 52 is configured to periodically poll the OLTs 30 to learn the registration state and possibly other information of each service being monitored.

As an example, assume that a particular OLT 30 provides voice service to a CPE 15 through an ONU 33. The voice data of such service may be communicated in accordance with a certain protocol, such as session initiation protocol (SIP), which is a known protocol for signaling and controlling multimedia communication sessions, including voice over Internet protocol (VoIP). In other embodiments, other types of protocols may be used for the monitored service as may be desired.

If SIP is used for a voice service being monitored, the service monitor 52 may be configured to submit a SIP command (e.g., a "show SIP status" command) for discovering the registration state of the voice service. In response, the fiber access platform implemented by the OLT 30 may be configured to respond with information indicating whether the service is currently registered (thereby indicating that the service is currently operational so that voice calls may successfully occur) or unregistered (thereby indicating that the service is not currently operational so that voice calls are not currently possible). Notably, such information may be obtained by the service monitor 52 irrespective of whether the customer is attempting to make a voice call at the time.

The service monitor 52 is configured to store the state information received from the OLT 30 as at least a portion of the service data 77. As an example, the service data 77 may be stored in a database, and the service monitor 52, for each poll or sample of data from the OLT 30, may create a new entry in the database and store the received state information in the new entry. In some embodiments, for each sample, the service monitor 52 is configured to store at least the following information: the registration state of the service (e.g., whether the service is currently registered or unregistered and thus whether the service is currently operational), the fiber access platform (FAP) identifier of the FAP that provided the information for the sample, the Internet protocol (IP) address of the CPE 15 using the voice service, card identifier that identifies the card on which the OLT 30 resides, port identifier that identifies the port of the access node 22 through which the traffic of the service flows, ONU identifier that identifies the ONU 33 through which the traffic of the service flows, IP of the registration, and a timestamp indicating the approximate time of the sample, although the service monitor 52 may be configured to store other information in other embodiments.

Thus, the service data 77 can be analyzed to determine when loss of service for the monitored service occurs and the approximate duration of the loss of service. In this regard, when a sample (referred to hereafter as the "loss-of-registration (LOR) sample") indicates that the state of the service has transitioned to unregistered, the service monitor 52 may detect a "loss-of-registration (LOR) event." The service monitor 52 may also analyze future samples to determine when the next sample indicating a registered state occurs (referred to hereafter as the "operational sample"). The duration of the LOR event may be calculated by subtracting the timestamp of the LOR sample from the timestamp of the operational sample. In other embodiments, other techniques for determining the operational state of the service and the duration of an LOR event may be used.

In some embodiments, the service monitor 52 may be configured to poll the OLT 30 periodically, such as about every 15 minutes or some other amount of time, to discover the status of the service being monitored. Such a technique has a benefit of not requiring modification or the incorporation of specialized functionality into conventional OLTs 30. However, it is possible that an OLT 30 may be configured to provide the status information, including service registration information, to the service monitor at certain times (e.g., periodically or when the OLT 30 detects a change in the status (e.g., registration state) of the service). Yet other techniques for communicating status information, including information indicative of loss-of-registration events, are possible.

Using the techniques described herein, it is possible for the service monitor 52 to store a large amount of status information in the service data 77 for each service being monitored. It is also possible for the service monitor 52 to detect, based on the service data 77, a large number of LOR events, some of which may be of little interest to a technician or network administrator considering that at least some LOR events occur in a healthy network environment (e.g., resulting from normal or expected operating conditions) or from problems that are not within the responsibility of the administrator or technician. Moreover, presenting a user, such as a network administrator or technician, with an alert of every instance of a LOR event would likely be unmanageable, making it difficult for the user to extract much useful information from the alerts provided by the service monitor 52.

In some embodiments, the service monitor 52 is configured to analyze the service data 77 and make decisions when the information in the service data 77, including the LOR events, indicate a condition for which an alert should be generated. That is, the service monitor 52 effectively filters or otherwise processes the service data 77 such that each LOR event does not result in an alert. There are various techniques and algorithms that may be used to analyze the service data 77 to detect conditions for which an alert should be sent.

As an example, in some embodiments, the service monitor 52 is configured to analyze the status information for a service and to count a number of LOR events that are detected for that service over a certain window of time (e.g., during the last 24 hours, week, or month). If the counted number of LOR events exceeds a predefined threshold, thereby indicating that the LOR events are occurring at a sufficiently high rate such that an abnormal network condition may be causing or contributing to the LOR events, then the service monitor 52 may be configured send an alert to a user.

Such alert may include various information that helps the user to identify the reason of the alert and to diagnose the problem. As an example, the alert may include information that identifies the service and/or the OLT 30, ONU 33, and/or CPE 15 that provide the service, as well as the nature of the problem (e.g., the number and/or timestamps of the detected LOR events). In some cases, the alert may include the history of LOR events detected indicating the time and duration of each LOR event detected in the applicable window. Yet other information about the detected condition may be provided in other examples.

Notably, the detected LOR events that ultimately result in the detection of a network problem and, hence, sending of an alert may be transparent to the customer. As an example, the LOR events of a voice service may be detected and used to generate an alert irrespective of whether the customer is attempting to use the voice service or has noticed degradation of the voice service. Thus, various problems and conditions may be detected by the service monitor 52 even before the customer realizes that a problem exists.

In some embodiments, the duration of LOR events may be used by the service monitor 52 to detect certain conditions and/or to determine whether an alert should be generated. For example, rather than counting each LOR event that is detected, as described above, the service monitor 52 may be configured to count the number of LOR events having a duration that exceeds a predefined threshold. If the count of such LOR events exceeds another threshold, then the service monitor 52 may be configured to send an alert as described above.

In some embodiments, the service monitor 52 may be configured to evaluate whether a given LOR event is potentially indicative of a network problem that warrants further investigation (e.g., should be included in a count to determine whether an alert should be sent or should otherwise be used to decide whether an alert should be sent) or whether is it not indicative of such a network problem and thus should be ignored. As an example, the service monitor 52 may be configured to determine whether an LOR event is correlated with another problem that has been detected within the system 10 and then ignore the LOR event (without using it as a factor or basis for sending an alert) if such a correlation can be identified.

In this regard, as shown by FIG. 3, the service monitor 52 may have access to network data 79 that is indicative of the configuration of the system 10 or various problems detected within the system 10. For example, if the signal between the OLT 30 and ONU 33 is temporarily lost, the network data 79 may indicate that such a loss-of-signal event occurred as well as indicate the timing of the loss-of-signal event (i.e., when the loss-of-signal event occurred). When the service monitor 52 determines, based on the service data 77, that an LOR event has occurred for a voice service associated with a particular OLT 30 and ONU 33, the service monitor 52 may consult the network data 79 to determine whether another problem may be indicated that could have caused the LOR event detected by the service monitor 52. For example, if the service monitor 52 determines that the LOR event for the voice service occurred at the same time as the signal loss between the OLT 30 and the ONU 33, then the service monitor 52 may determine that the LOR event was likely caused by the signal loss and that there is no need to further investigate or analyze the LOR event to try to diagnose problems with the voice service. Thus, the service monitor 52 may be configured to ignore the LOR event rather than counting it in making a decision whether to send an alert, as described above.

Note that there may be other types of problems or events, such as for example excessive PON utilization or packet discards, correlated with one or more LOR events such that the LOR events are likely attributable to the correlated event or problem and generation of an alert for the detected LOR events is not desirable. However, if the service monitor 52 is unable to correlate the LOR event with another event or problem that is likely to have caused the LOR event, then the service monitor 52 may be configured to use the LOR event as a factor in sending an alert (e.g., counting the LOR event for the purpose of deciding whether to send an alert).

Note that there are various techniques that may be used to define the network data 79. As an example, conventional devices or systems for monitoring the operation and health of a communication system may be used to generate the network data 79. At least some of the network data 79 may be provided (e.g., input by a user). As an example, after a technician diagnoses a network problem, he or she may provide information indicative of the problem. Such network data 79 may be stored in a database or otherwise at a location remote from or at the same location as the service monitor 52, which may be configured to retrieve the network data 79 as may be desired. Yet other techniques for defining or accessing the network data 79 are possible.

In some embodiments, the service monitor 52 correlates one or more LOR events for one voice service with LOR events for other voice services based on geographic location, time of occurrence, and/or rate of occurrence, as will be described in more detail below, and the service monitor 52 may use such correlation for deciding whether an alert is to be generated and/or the type of information to include in the alert.

In this regard, the network data 79 may correlate each CPE 15 with coordinates indicating the CPE's geographic location such that the service monitor 52 is aware of the geographic locations of the CPEs 15 associated with the services being monitored. When an LOR event is detected for one voice service associated with a given CPE 15 (referred to hereafter as the "LOR CPE"), the service monitor 52 may be configured to analyze the service data 77 to determine if other voice services provided by other CPEs 15 in close proximity to the LOR CPE 15 (e.g., in the same neighborhood) experienced an LOR event at about the same time. If the voice services of at least a certain number of the CPEs 15 in close proximity to each other are determined to have experienced an LOR event at about the same time, the service monitor 52 may be configured to determine that an alert is to be generated, and in response, transmit an alert message to a user. Such an alert message may include information about the LOR events, such as the total number of LOR events detected at about the same time, as well as a list of the LOR events (including timestamps and sufficient information to identify the voice services, such as the ONU or CPE identifier associated with the voice service). Moreover, the large number of LOR events for services provided by CPE in a close proximity may be indicative of large-scale network problem affecting more than a single service, and the alert may help the user to realize the scope of the problem and, thus, facilitate identification and diagnosis of the problem.

In other embodiments, the service monitor 52 may be configured to count the number of LOR events detected for voice services associated with CPE 15 in a certain geographic region, such as the same neighborhood, over a certain window of time (such as the last day, week, or month). As an example, the service monitor 52 may be configured to count the total number of LOR events detected for voice services associated with CPE 15 in the geographic region and compare the count to a predefined threshold. If the threshold is exceeded, then it may be determined that there were a sufficiently high number of LOR events occurring such that there is likely a correctable problem in the network equipment servicing the geographic region. In such example, the service monitor 52 may be configured to generate and transmit an alert to a user informing such user of the detected LOR events of interest and the correlation of the LOR events with the geographic region.

By correlating LOR events with other network events or problems and/or with geographic regions associated with LOR events of similar services, as described above, the service monitor 52 may make better decisions about when to send an alert to a user, thereby improving the effectiveness of the information provided by the service monitor 52.

In some embodiments, the service monitor 52 may be configured to use the information that it receives from the access node 22, as described above, in order to detect a misconfiguration of a device associated with a service being monitored. This may occur, for example, when the service is at one point registered and operational, but a technician or other user inadvertently changes the configuration (e.g., a setting) of a device (e.g., an OLT 30 or ONU 33) used to provide the service or makes another type of system misconfiguration (e.g., fails to fully turn up the service) such that a registration state is not achievable on a going-forward basis. If the service monitor 52 detects such a misconfiguration, it is configured to 52 transmit an alert message, as described above. Such alert message may include information indicating that a system misconfiguration has been detected, as well as other information discovered about the misconfiguration such as the type of detected misconfiguration for example.

Note that there are various techniques that may be used to detect a misconfiguration. For example, when the access node 22 (e.g., an OLT 30 of the access node 22) responds to a request for the registration state of a service, the access node 22 may respond with information indicating that the service is not yet capable of being registered. For example, in SIP, a response to a "show SIP status" command indicates the registration state to be "initial" when the service is not yet fully configured for operation. Such a response may indicate to the service monitor 52 not only that the service is currently unregistered but also that there is some sort of misconfiguration (e.g., unfinished configuration) such that the service is not currently capable of registration. In other examples, other types of messages (e.g., "port not configured") in response to the request for the registration state may indicate a misconfiguration that prevents registration from occurring. Based on such a response, the service monitor 52 may be configured to transmit an alert message indicating the detection of the misconfiguration. Such alert message may include information about the message received from the access node 22, such as the status returned by the access node 22, to assist the recipient of the message in diagnosing the problem.

An exemplary operation and use of the system 10 will now be described with particular reference to FIG. 4.

Figure 4:
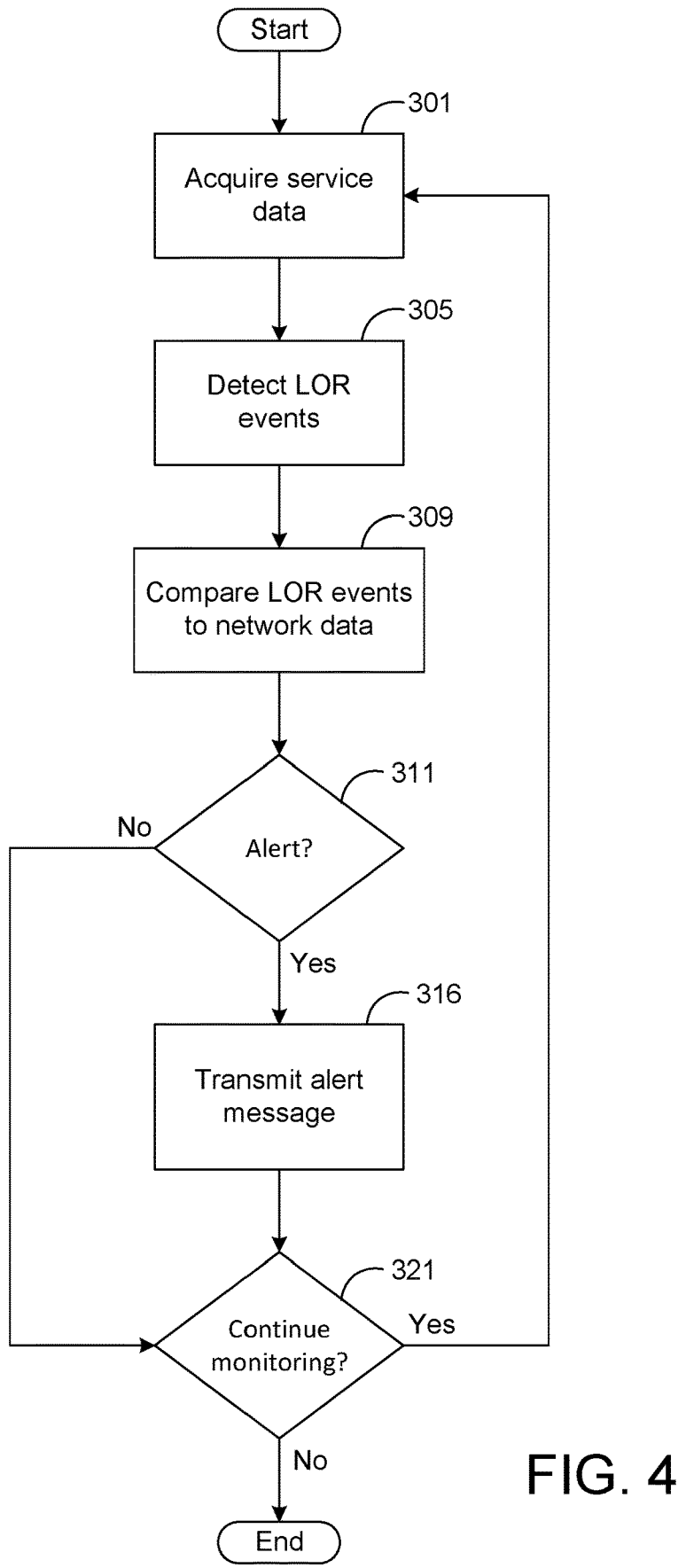
FIG. 4 is flow chart illustrating an exemplary method for monitoring a communication system.

In this regard, the service monitor 52 is configured to acquire service data 77 that may be used to detect LOR events for one or more voice services and/or other types of services, as shown by block 301 of FIG. 4. As an example, for a given voice service, the service monitor 52 may be configured to periodically poll (e.g., every 15 minutes or at other times) the OLT 30 providing the voice service to learn various status information, as described above, including at least the registration state of the voice service. Such polling may occur over time such that many samples of the status information about the voice service are stored in the service data 77. As noted above, other techniques may be used to acquire the service data 77, such as configuring the OLT 30 to report the information periodically or report the information when a change in the status information occurs.

From time-to-time, the service monitor 52 analyzes the service data 77 to detect LOR events associated with the voice service being monitored, as shown by block 305 of FIG. 4. For example, an LOR event may be detected when the registration state of the voice service changes from registered for one sample to unregistered for the next sample (referred to as the start of the LOR event). The duration of the LOR event may be calculated by identifying the next sample (referred to as the end of the LOR event) for which the registration state is again indicated as registered and then subtracting the timestamp of the start of the LOR event from the timestamp of the end of the LOR event.

Upon detecting an LOR event, the service monitor 52 compares the LOR event to other events or problems indicated by the network data 79 to determine whether it is correlated with another detected event or problem that likely caused the LOR event, as shown by block 309 of FIG. 3. If so, the service monitor 52 may be configured to ignore the detection of the LOR event for the purpose of deciding whether to generate an alert. However, if not, the service monitor 52 may be configured to consider the LOR event in deciding whether an alert should be generated in block 311 of FIG. 4.

As an example, if the LOR event (referred to hereafter as "uncorrelated LOR event") is not correlated with another network event or problem that could be the root cause of the LOR event, then the service monitor 25 may be configured to transmit an alert message (e.g., email) to a predefined address in responding to detection of the LOR event, as shown by block 316 of FIG. 4. However, in other embodiments, in an effort to limit the amount of alerts generated, the service monitor 52 may be configured to consider the LOR event in a desired algorithm that assesses multiple LOR events and/or other factors in deciding whether to generate an alert.

For example, in some embodiments, the service monitor 52 may be configured to count the number of uncorrelated LOR events that occur for the voice service over a predefined window of time and generate an alert only if the counted number exceeds a predefined threshold. As noted above, the durations of the uncorrelated LOR events may also be taken into account, such as by only counting uncorrelated LOR events having a duration that exceeds a predefined threshold. Yet other techniques for using uncorrelated LOR events as factors in deciding whether to send alerts are possible.

In some embodiments, detected LOR events may be correlated with certain other network events or problems indicated by the network data 79 for the purpose of providing a user, such as an administrator or technician, with information to assist in diagnosing network problems. As an example, as noted above, if the service monitor 52 determines that a relatively large number of LOR events for voice services are occurring for CPE 15 in a small geographic region, such as within the same neighborhood, the service monitor 52 may be configured to send an alert (along with the relevant service data 77 and/or network data 79) notifying the user of the correlation. In other embodiments, other techniques for correlating LOR events with other detected network events or problems and then reporting such correlations for network diagnostic purposes are possible.

Notably, the monitoring of a voice service performed by the service monitor 52 may be achieved without having to change or reconfigure conventional network equipment, such as OLTs 30, used to provide the voice service. For example, by polling the OLTs 30 to receive status information, such as registration states, using commands or information requests compatible with the existing protocol of the platform for the voice service, the service monitor 52 is able to acquire the service data 77 from existing network equipment (e.g., OLTs). As noted above, in other embodiments, it is possible for the network equipment, such as OLTs 30, to be specially configured to provide information for the service data 77 to the service monitor 52.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

Now, therefore, the following is claimed:

1. A communication system, comprising:
an access node for a network, the access node having an access device coupled to customer premises equipment (CPE), the access device configured to provide at least one voice service for the CPE, wherein the access device is configured to communicate voice data for the voice service between the network and the CPE; and
a service monitor configured to receive from the access device information indicating registration states of the voice service over time, the service monitor configured to detect a plurality of loss-of-registration (LOR) events for the voice service based on the information and to determine a duration for each of the plurality of LOR events, the service monitor configured to store network data indicative of detected communication problems associated with the network and to determine whether each of the plurality of LOR events is caused by any of the detected communication problems, the service monitor further configured to transmit an alert in response to at least one of the plurality of LOR events that is determined not to be caused by any of the detected communication problems indicated by the network data.

2. The communication system of claim 1, wherein the access device is an optical line terminal.

3. The communication system of claim 1, wherein the service monitor is configured to a count a number of the plurality of LOR events determined not to be caused by any of the detected communication problems indicated by the network data, and wherein the service monitor is configured to determine whether to transmit the alert based on the count.

4. The communication system of claim 1, wherein the service monitor is configured to communicate with the access node via the network.

5. The communication system of claim 1, wherein the information received from the access device defines a plurality of samples for the voice service, each of the plurality of samples including a timestamp indicative of a time of the respective sample and specifying a registration state of the voice service.

6. The communication system of claim 1, wherein the service monitor is configured to detect a system misconfiguration associated with the voice service based on the information and to transmit an alert in response to detection of the system misconfiguration.

7. The communication system of claim 1, wherein the network data indicates a geographic location of the CPE, and wherein the service monitor is configured to determine whether to transmit the alert based on the geographic location indicated by the network data.

8. The communication system of claim 7, wherein the service monitor is configured to determine, based on the geographic location indicated by the network data, whether at least one of the plurality LOR events is correlated with a LOR event detected for a second voice service.

9. A communication method, comprising:
communicating data packets carrying voice data for a voice service with an access device of an access node for a network, the communicating comprising transmitting from the access device data packets carrying a portion of the voice data to be received by customer premises equipment (CPE) and receiving at the access device data packets carrying a portion of the voice data transmitted from the CPE;
receiving, from the access device, information indicating registration states of the voice service over time;
detecting a plurality of loss-of-registration (LOR) events for the voice service based on the information;
determining a duration for each of the plurality of LOR events based on the information;
storing, in memory, network data indicative of detected communication problems associated with the network;
determining whether each of the plurality of LOR events is caused by any of the detected communication problems; and
determining whether to transmit an alert in response to at least one of the plurality of LOR events that is determined not be caused by any of the detected communication problems indicated by the network data based on (1) the determining the duration for each of the plurality of LOR events and (2) the determining whether each of the plurality of LOR events is caused by any of the detected communication problems.

10. The method of claim 9, wherein the access device is an optical line terminal.

11. The method of claim 9, further comprising counting a number of the plurality of LOR events determined not to be caused by any of the detected communication problems indicated by the network data, wherein the determining whether to transmit the alert is based on the counting.

12. The method of claim 9, further comprising communicating with the access node through a network, wherein the information is received from the network.

13. The method of claim 9, wherein the information received from the access device defines a plurality of samples for the voice service, each of the plurality of samples including a timestamp indicative of a time of the respective sample and specifying a registration state of the voice service.

14. The method of claim 9, further comprising:
detecting a system misconfiguration associated with the voice service based on the information; and
transmitting an alert in response to the detecting the system misconfiguration.

15. The method of claim 9, wherein the network data indicates a geographic location of the CPE, and wherein the determining whether to transmit the alert is based on the geographic location indicated by the network data.

16. The method of claim 15, further comprising determining, based on the geographic location indicated by the network data, whether at least one of the plurality LOR events is correlated with a LOR event detected for a second voice service.

* * * * *